H. RICHTER.
COMBINATION CONFECTIONERY AND VALENTINE BOX.
APPLICATION FILED NOV. 29, 1907.
901,476. Patented Oct. 20, 1908.
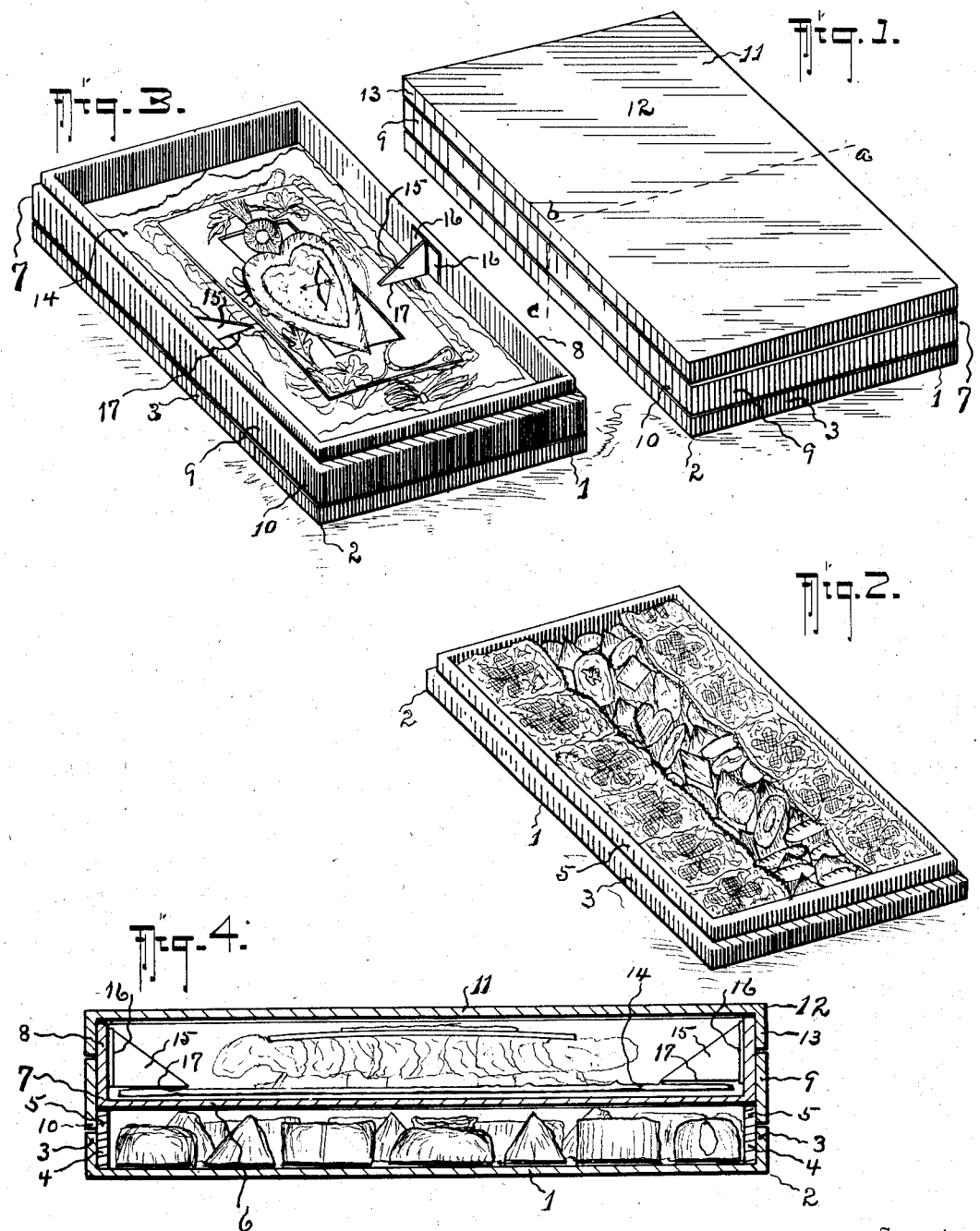
Witnesses
Arthur Sturges
Geo. Geddings
Inventor
Harry Richter
By Hiram A. Sturges,
Attorney

UNITED STATES PATENT OFFICE.

HARRY RICHTER, OF OMAHA, NEBRASKA.

COMBINATION CONFECTIONERY AND VALENTINE BOX.

No. 901,476.  Specification of Letters Patent.  Patented Oct. 20, 1908.

Application filed November 29, 1907. Serial No. 404,418.

*To all whom it may concern:*

Be it known that I, HARRY RICHTER, a citizen of the United States, residing at Omaha, in the county of Douglas and State of Nebraska, have invented certain new and useful Improvements in Combination Confectionery and Valentine Boxes, of which the following is a specification.

The object of this invention is to provide a box having a lower compartment for confectionery storage, and an upper receptacle suitable for holding a valentine securely and in a manner to prevent its injury.

The invention has reference to the method of forming and assembling leaves for rims and partitions, and the use of movable wings as securing or holding means, and to certain features of utility and economy in manufacture, all fully described herein, pointed out by the claims, and illustrated in the drawing, wherein,—

Figure 1 is a perspective view, showing the invention after the parts have been assembled. Fig. 2 is a perspective view of the confectionery box or lower receptacle. Fig. 3 is a perspective view of the upper receptacle, and Fig. 4 is a vertical presentation of the invention sectioned on line *a b c* of Fig. 1.

Referring now to the drawing for a more particular description, numeral 1 indicates a rectangularly formed leaf, being the bottom of the lower receptacle 2, having an upturned rim 3. Secured upon the inner side of and parallel with the upturned rim 3 of the lower receptacle is the sustaining-leaf 4 having an upwardly-extended portion 5 passing above the plane of rim 3.

Numeral 6 indicates a rectangularly-formed leaf, being the bottom of the upper receptacle 7, having an upturned rim 8, and when the parts are assembled the upturned rim 8 is in alinement with sustaining-leaf 4 of the lower receptacle. I employ the inclosing-leaf 9 which covers the lower part of and is secured upon the upturned rim 8 of bottom 6, said inclosing-leaf having a less width than rim 8 and having an extended portion 10 passing below the plane of bottom 6. The inclosing-leaf 9 is disposed upon the same plane as the upturned rim 3 and therefore incloses the upwardly-extending portion 5 of sustaining-leaf 4.

Numeral 11 indicates a rectangularly-formed leaf, being the top of lid 12 having a transversely-formed rim 13, and the latter, when the parts are assembled, is in alinement with inclosing-leaf 9. As thus constructed, the weight of the upper receptacle rests conjointly upon the upturned rim 3 of the lower receptacle and sustaining-leaf 4 and any sidewise movement of the upper receptacle upon this seating is prevented by reason of inclosing-leaf 9 contacting with the upper portion 5 of sustaining-leaf 4; the upturned rim 8 and its contact with transverse rim 13 prevents any sidewise movement of the lid.

The upper and lower receptacles and lid may be assembled as a unit and may be readily separated, as is evident; and the construction affords a very convenient and secure compartment for the storage of confectionery within box 2, and a valentine or other similar article may be secured as hereinafter described within the upper receptacle, the latter preferably having a deeper chamber than the lower box.

It will be noted that, since the inclosing-leaf 9 has a less width than rim 8, the upper receptacle has a greater depth than the lower receptacle, so long as the width of rim 13 remains unchanged, and this difference in depth is desired for the uses mentioned.

The base of the valentine or article within the upper receptacle is indicated at 14 and rests upon the bottom 6, and, in order that it may be securely held within this receptacle when cover 11 may be removed, and that it may be held or secured upon the bottom thereof to prevent the valentine from making contact with cover 11, wings 15 are employed; these wings are constructed, preferably of card board with integral flanges 16 adhesively secured upon the inner sides of the upturned rim 8 midway between the ends of the upper receptacle; and since this material is flexible, the wings may be bent upon their flanges to swing transversely with reference to rim 8 to a position above and adjacent bottom 6 and base 14, so that the lower edges or bases 17 of the wings contact with the base 14 of the valentine to secure the latter within this receptacle and prevent a contact with the cover during shipment or handling, and thereby prevent defacement or injury.

As thus described, the device affords a secure housing for these articles, and by reason of the formation and arrangement of parts, it may be economically constructed.

Having fully described my invention, what

I claim as new and desire to secure by Letters Patent is,—

1. A confectionery and valentine box comprising a first rectangularly-formed leaf provided at its edges with an upturned rim and having an inner sustaining-rim secured thereon extended in the plane of said upturned rim to form a lower receptacle; a second rectangularly-formed leaf provided at its edges with an integral upturned rim and having an outer inclosing-rim extended below the plane of said integral upturned rim to form an upper receptacle; flexible holding-wings having flanges secured upon the inner sides of the integral upturned rim of said second rectangularly-formed leaf and adapted to have a movement to a position transverse thereto; said upper receptacle adapted to be seated upon the lower receptacle to cause its integral upturned rim and its outer inclosing-rim to be disposed in alinement, respectively, with the upturned rim and the inner sustaining-rim of said lower receptacle; a cover adapted to have a seating upon the upper receptacle and provided with a down-turned rim disposed in alinement with the inclosing-rim of said upper receptacle, the weight of said upper receptacle resting partly upon the upturned rim of the lower receptacle and partly upon the inner sustaining rim of said lower receptacle.

2. In a combined confectionery and valentine box, the combination with a lower box-like receptacle of an upstanding member which lies within said box-like receptacle and projects above the edge thereof entirely around said receptacle, an upper box like receptacle which rests upon said upstanding member, a vertically disposed member surrounding said upper box-like member and projecting below the lower edge thereof entirely therearound, the lower edge of said vertically disposed member resting upon the upper edge of the lower box-like receptacle the edge of the upper receptacle projecting above said vertically disposed member, a cover having a downturned edge which rests upon the upper edge of the vertically disposed member and flexible wings secured to the inner walls of the upper receptacle and adapted to be bent inwardly over the bottom of said receptacle.

In testimony whereof I have affixed my signature in presence of two witnesses.

HARRY RICHTER.

Witnesses:
 HIRAM A. STURGES,
 C. D. PRENTISS.